(12) United States Patent
Dinger et al.

(10) Patent No.: US 8,516,098 B2
(45) Date of Patent: Aug. 20, 2013

(54) IMPROVING SCALE BETWEEN CONSUMER SYSTEMS AND PRODUCER SYSTEMS OF RESOURCE MONITORING DATA

(75) Inventors: John E. Dinger, Cary, NC (US); Randy George, Austin, TX (US); Daniel Joseph Martin, Pawling, NY (US); David Joel Pennell, Sr., Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 12/352,842

(22) Filed: Jan. 13, 2009

(65) Prior Publication Data

US 2010/0180020 A1    Jul. 15, 2010

(51) Int. Cl.
*G06F 15/173* (2006.01)

(52) U.S. Cl.
USPC ........... 709/223; 709/224; 709/225; 709/227; 709/231; 705/14.11; 705/14.17; 705/14.23; 705/14.41

(58) Field of Classification Search
USPC ...... 709/223, 224, 225, 226, 231; 705/14.41, 705/14.11
See application file for complete search history.

(56) References Cited

U.S. PATENT DOCUMENTS

| | | | | |
|---|---|---|---|---|
| 6,393,485 | B1 * | 5/2002 | Chao et al. | 709/231 |
| 6,553,403 | B1 | 4/2003 | Jarriel et al. | 709/202 |
| 6,801,926 | B1 | 10/2004 | Shisler et al. | 709/201 |
| 2005/0138642 | A1 | 6/2005 | Breh et al. | 719/318 |
| 2005/0154625 | A1 * | 7/2005 | Chua et al. | 705/7 |
| 2006/0095562 | A1 * | 5/2006 | Agarwal et al. | 709/224 |
| 2008/0071871 | A1 * | 3/2008 | Cohen et al. | 709/206 |
| 2008/0154739 | A1 * | 6/2008 | Kalaboukis | 705/26 |
| 2009/0240644 | A1 * | 9/2009 | Boettcher et al. | 706/47 |

FOREIGN PATENT DOCUMENTS

EP    1 944 695 A1    7/2008

OTHER PUBLICATIONS www.csd.uoc.gr/~hy565/newpage/docs/pdfs/.../HPL-2002-180.pdf "Analysis on Service Level Agreement of Web Services"—HP Corporation, Jun. 2002.*
citeseerx.ist.psu.edu/viewdoc/download?doi=10.1.1.107 "SLAs a Key Commercial Tool"—Cite Seer X, May 2004.*
N. Anerousis, "An Architecture for Building Scalable. Web-based Management Services", 27 pages, 1999.
PCT search report and written opinion for Application No. PCT/EP2010/050159, mailed Jun. 24, 2010, 10 pages.

* cited by examiner

*Primary Examiner* — Krista M. Zele
*Assistant Examiner* — Randy Scott
(74) *Attorney, Agent, or Firm* — VanLeeuwen & VanLeeuwen; Jeffrey S. LaBaw

(57) ABSTRACT

A consumer system receives capabilities metadata from a producer system that includes resource class metrics for a resource class included in the producer system. Next, the consumer system creates a rule that corresponds to one of the consumer system's managed entities. The rule includes one or more prescriptions that reference the resource class metrics and specify a periodicity, which informs the producer system as to a time interval for which to send prescription results that includes metric information pertaining to the resource class metrics. The consumer system sends the rule to the producer system and, in turn, the consumer system receives the prescription results from the producer system at the specified periodicity and applies the metric information to the managed entity.

26 Claims, 11 Drawing Sheets

FIG. 11A

Capabilitiies Metadata 1100

Resource Class A
   Resource Attributes
   Resource Event Descriptions
   Resource State Change Events
   Resource Lifecycle Events
   Metric X
      Metric X Name
      Metric X Periodicity
      Metric X Threshold Crossing
   Metric Y
      Metric Y Name
      Metric Y Peridocity
      Metric Y Threshold Crossing

FIG. 11B

Rules 1140

Rule D
   Rule D Group Name Clause
   Rule D Membership Clause
   Status Prescriptions
      ResourceClassA.MetricX@periodicity
      ResourceClassA.MetricY.ThresholdCrossingEvent
      ResourceClassA.Event
Rule E
   Rule E Group Name Clause (Subordinate to Rule D)
   Rule E Membership Clause (Subordinate to Rule D)
   Status Prescriptions
      ResourceClassA.MetricY@periodicity
      ResourceClassA.MetricX.ThresholdCrossingEvent
      ResourceClassA.Event

FIG. 11C

Prescription Results 1160

Rule D Results
   Rule D Group Name
   Rule D Identifier
   Timestamp D
   ResourceClassA.MetricX@periodicity Result
   ResourceClassA.MetricY.ThresholdCrossingEvent Result
   ResourceClassA.Event Result
Rule E Results
   Rule E Group Name
   Rule E Identifier
   Timestamp E
   ResourceClassA.MetricY@periodicity Result
   ResourceClassA.MetricX.ThresholdCrossingEvent Result
   ResourceClassA.Event Result

IMPROVING SCALE BETWEEN CONSUMER SYSTEMS AND PRODUCER SYSTEMS OF RESOURCE MONITORING DATA

BACKGROUND OF THE INVENTION

1. Technical Field

The present invention relates to improving scale between consumer systems that receive resource monitoring data and producer systems that provide the resource monitoring data. More particularly, the present invention relates to allowing a consumer system to dictate, to a producer system, periodicities at which to provide relevant resource monitoring data as well as instructing the producer system to aggregate specific resource monitoring data events.

2. Description of the Related Art

Monitoring complex entities like service oriented architecture (SOA) services and/or networks often involves integrating two or more management applications in such a way that one management system (producer system) is sending periodic status information to another management system (consumer system). A common example utilizing this architecture is a service monitoring (SM) application that receives performance metrics and threshold crossing events from one or more performance management (PM) systems. Many of these integration scenarios involve the consumer system receiving general metrics from the producer system. In turn, the consumer aggregates and maps the metrics to the consumer system's devices based upon the consumer system's layout.

SUMMARY

A consumer system receives capabilities metadata from a producer system that includes resource class metrics for a resource class included in the producer system. Next, the consumer system creates a rule that corresponds to one of the consumer system's managed entities. The rule includes one or more prescriptions that reference the resource class metrics and specify a periodicity, which informs the producer system as to a time interval for which to send prescription results that includes metric information pertaining to the resource class metrics. The consumer system sends the rule to the producer system and, in turn, the consumer system receives the prescription results from the producer system at the specified periodicity and applies the metric information to the managed entity.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 11A is a diagram showing an exemplary embodiment of capabilities metadata generated by a producer system;

FIG. 11B is a diagram showing an exemplary embodiment of rules generated by a consumer system; and FIG. 11C is a diagram showing an exemplary embodiment of prescription results generated by a producer system based upon rules received from a consumer system.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
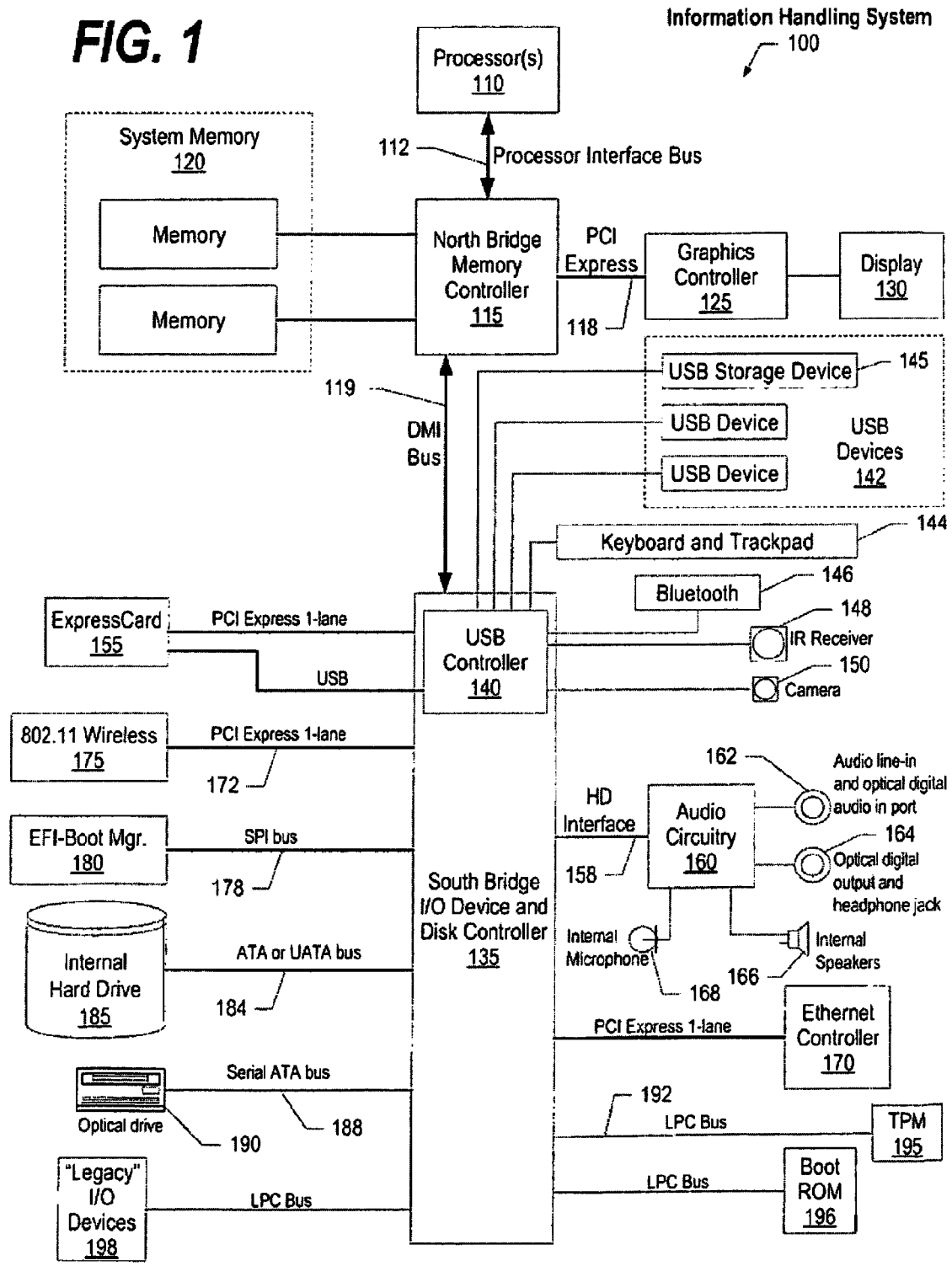
FIG. 1 is a block diagram of a data processing system in which the methods described herein can be implemented.
Figure 2:
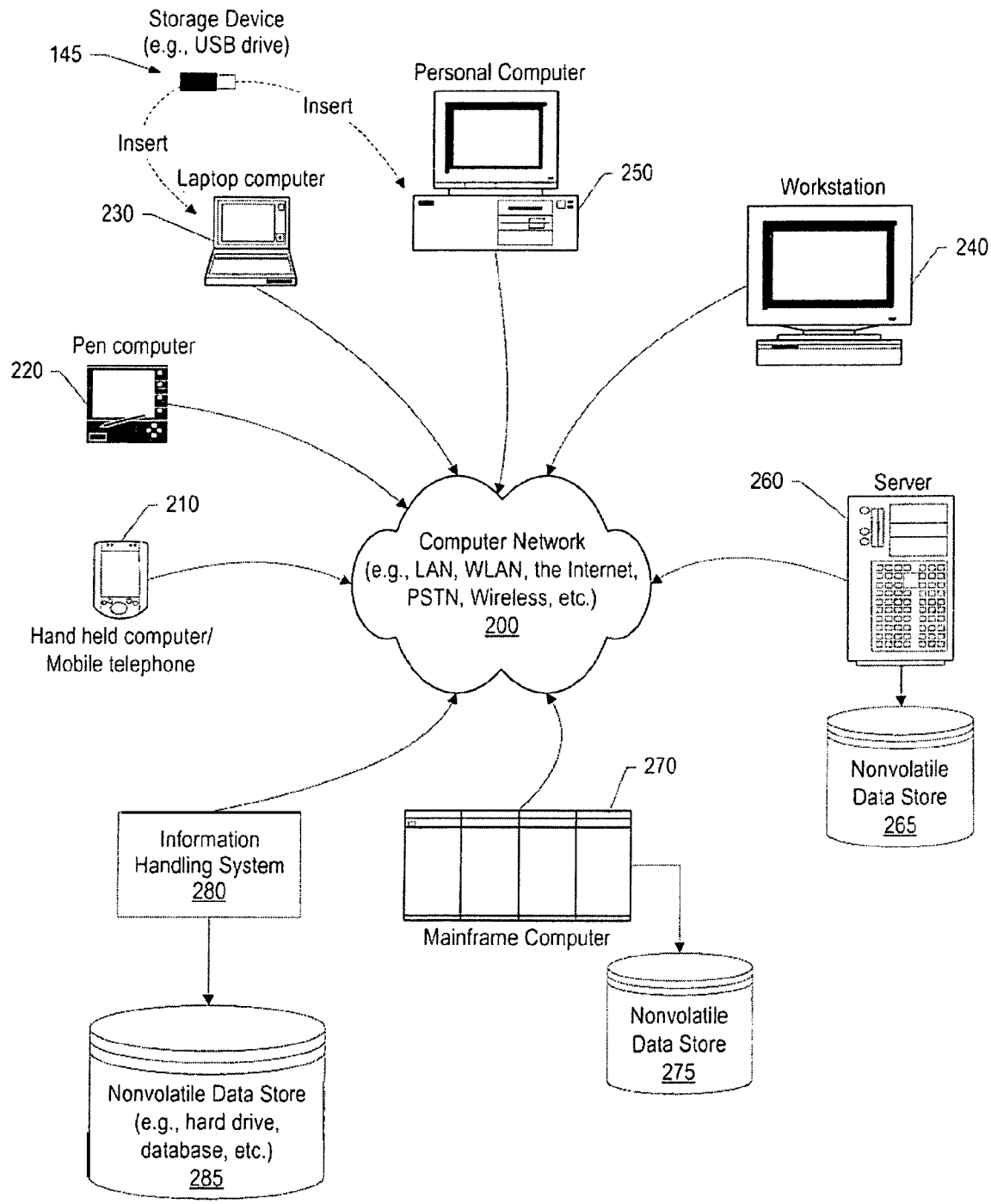
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130 such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
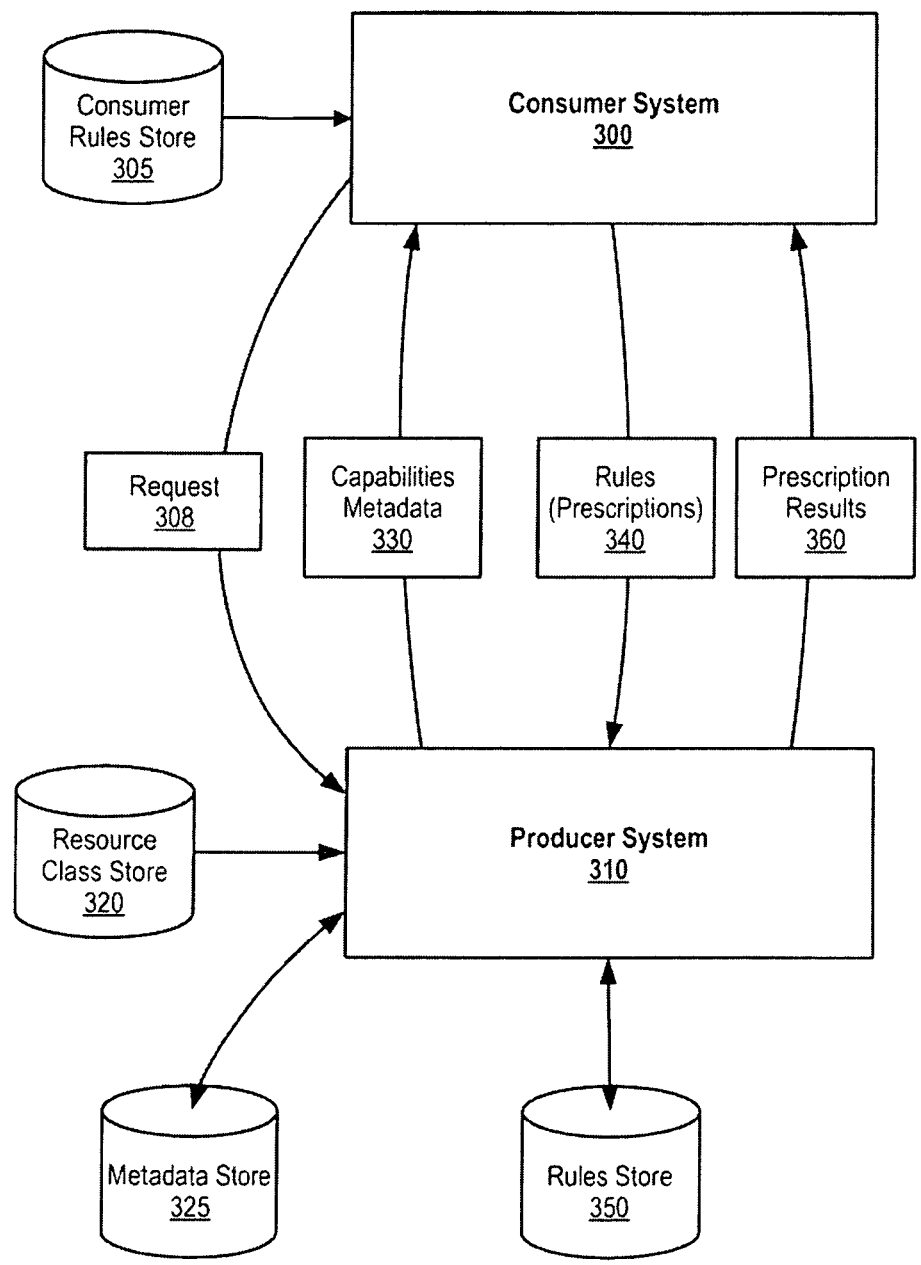
FIG. 3 is a diagram showing a consumer system instructing a producer system as to which event information to aggregate and provide at a specified periodicity.

FIG. 3 is a diagram showing a consumer system instructing a producer system as to which event information to aggregate and provide at a specified periodicity. Consumer system 300 includes managed entities that are organized in a hierarchal manner (see FIG. 4 and corresponding text for further details). Producer system 310 provides resources and associated metric information during producer system 310's operation. In one embodiment, consumer system 300's managed entities may be service oriented components that utilize metric information generated by producer system 310's resources (see FIG. 4 and corresponding text for further details).

Consumer system 300 sends request 308 to producer system 310, which requests producer system 310 to provide metadata that includes metric information that producer system 310 is capable of providing, such as "inbound traffic." Producer system 310 retrieves resource classes from resource class store 320 (e.g., interfaces, ports, etcetera), and generates capabilities metadata for each resource class, which producer system 310 stores in metadata store 325. Resource class store 320 and metadata store 325 may be stored on a nonvolatile storage area, such as a computer hard drive. Once producer system 310 generates capabilities metadata for each resource class, producer system 310 sends capabilities metadata 330 to consumer system 300. In one embodiment, producer system 310 generates capabilities metadata 330 prior to receiving request 308.

Consumer system 300 analyzes the metadata and generates rules, which include prescriptions that reference metrics included in the capabilities metadata. As used herein, the word "prescription" describes a process that consumer system 300 establishes rules by which data will be reported by producer systems. This is to distinguish the invention from typical "subscription" processes wherein the producer system advertises available information as the producer system has chosen to format the information, and, as a result, the consumer systems are limited to selecting from the available choices. Consumer system 300 stores the rules in consumer rules store 305. Using the example described above, capabilities metadata 330 may include a metric for the interface resource class, and specify a periodicity in which to provide the inbound traffic information (e.g., between once every minute to once every day). In this example, consumer system 300 may generate a rule that instructs producer system 310 to provide the inbound traffic information on an hourly basis. In another example, consumer system 300 may generate a rule that instructs producer system 310 to aggregate multiple metrics and provide the aggregated result to consumer system 300 (see FIGS. 8, 11B, and corresponding text for further details). Consumer rules store 305 may be stored on a nonvolatile storage area, such as a computer hard drive.

Once consumer system 300 generates rules, consumer system 300 sends rules 340 to producer system 310, which producer system 310 stores in rules store 350. Producer system 310 tracks metric information based upon rules 340, and provides prescription results 360 to consumer system 300 accordingly. Using the example described above, producer system 310 sends inbound traffic information to consumer system 300 on an hourly basis. In another example, producer system 310 sends metric information when the metric information reaches a certain threshold, such as when inbound traffic exceeds a value specified by consumer system 300. In yet another example, producer system 310 sends aggregated metric information to consumer system 300.

Figure 10:
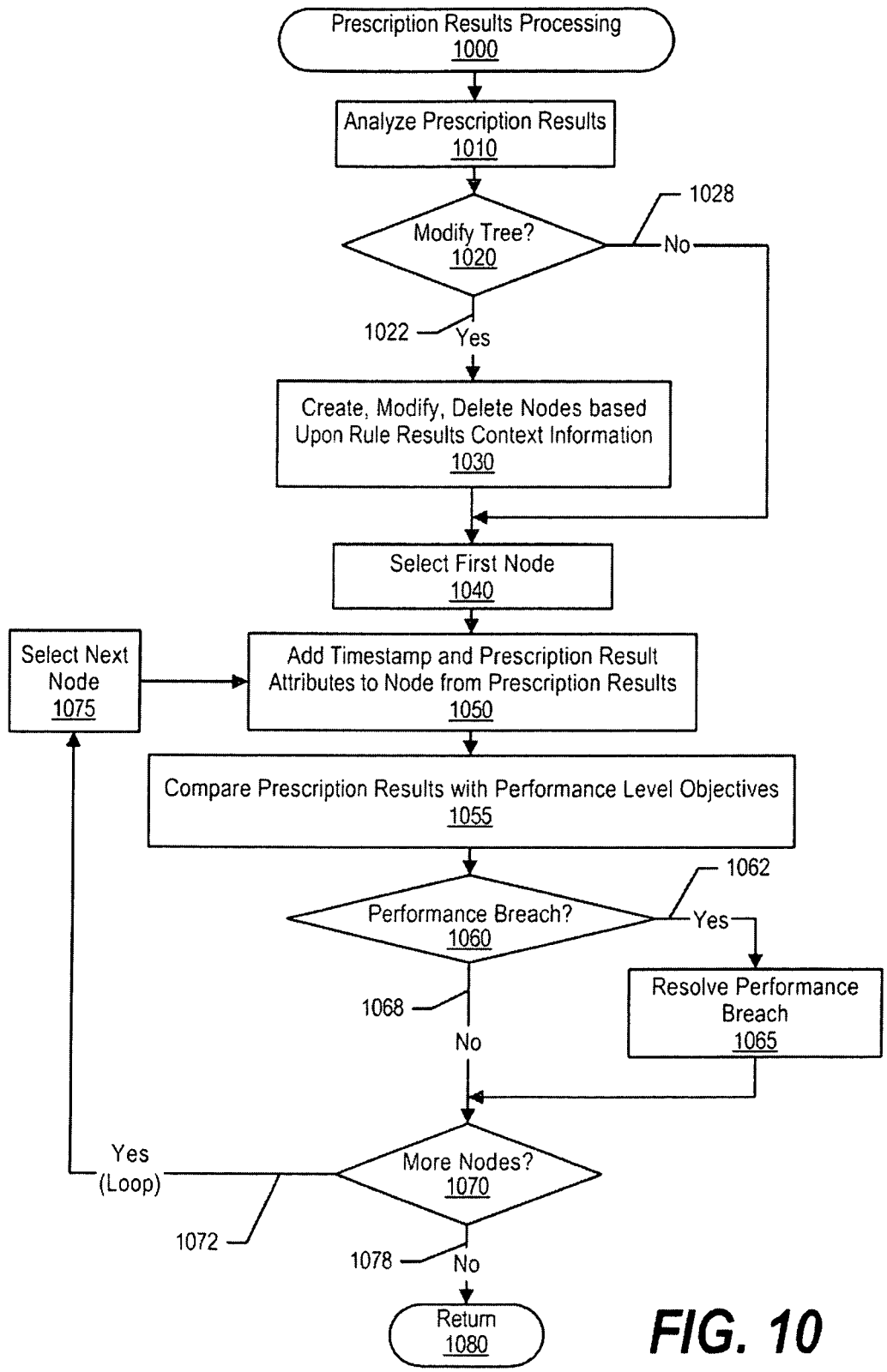
FIG. 10 is a flowchart showing steps taken in a consumer system processing prescription results generated by a producer system and applying the prescription results to the consumer system's managed entities.

Consumer system 300 analyzes prescription results 360 and applies the results to the managed entities included in consumer system 300 (see FIG. 10 and corresponding text for further details).

Since producer system 310 only delivers data actually required by consumer system 300 rather than delivering all data and letting consumer system 300 filter it, producer system 310 can apply finer grained security policies resulting in improved security. In addition, by having consumer system 300 specify which data to provide and at what intervals, the overhead of synchronizing data collected about resources from producer system 310 to consumer system 300 is eliminated. Since resources are not synchronized or replicated from producer system 310 to consumer system 300, consumer system 300 and producer system are dynamically scalable, even when consumer system 300 maps to multiple producer systems. Since mapping, aggregation and analytics are performed at producer system 310, the fidelity and accuracy of analytics used by consumer system 300 are substantially more efficient.

As discussed in further detail below, the multi-level grouping mechanism described herein allows consumer system 300 to define rules for automatically instantiating service structures based on producer system 310's resource classes and attributes. As such, the service structure instances are automatically discovered and organized without requiring global visibility of the resource inventory.

Figure 4:
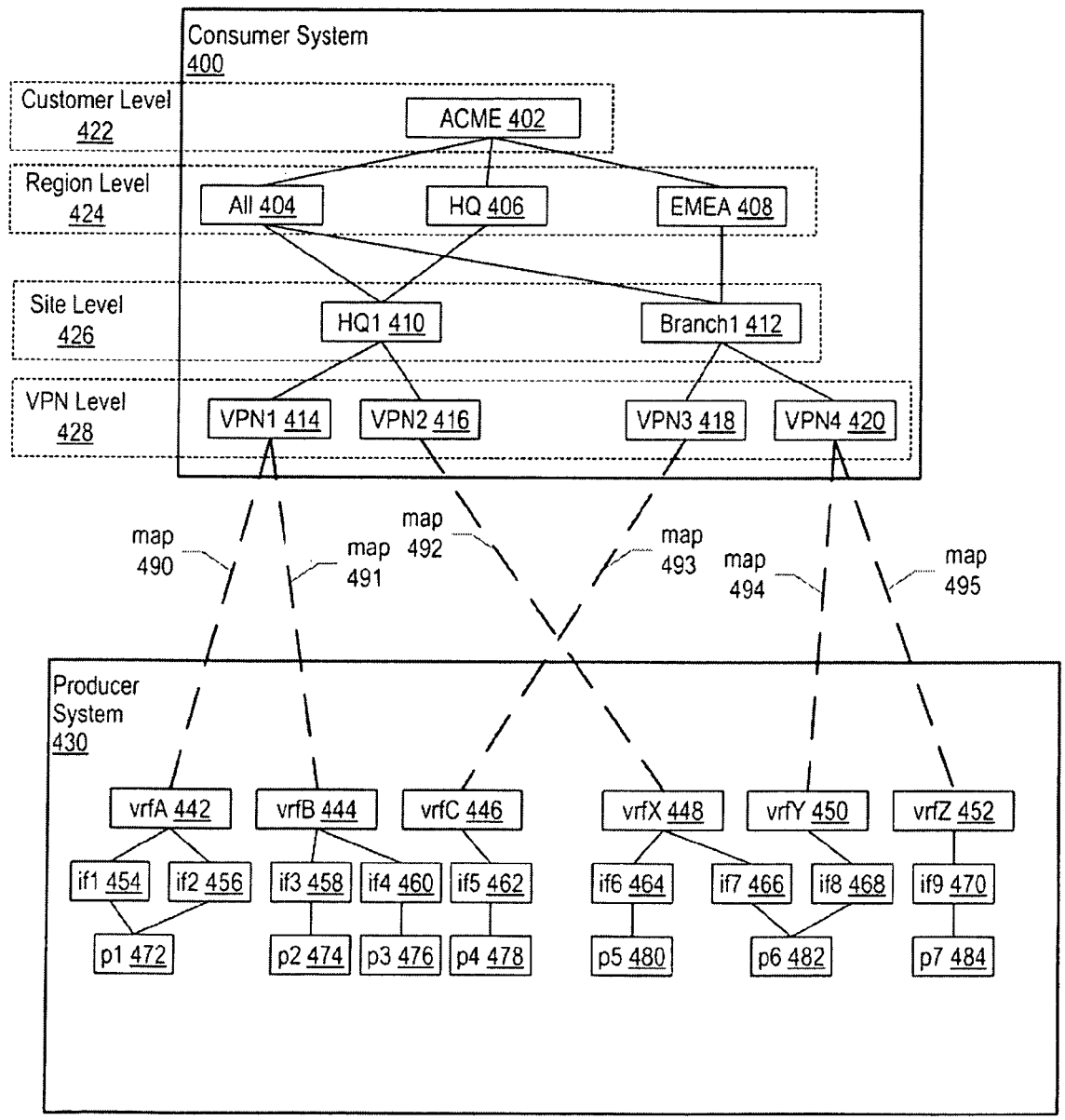
FIG. 4 is a diagram of a consumer system's managed entities mapped to a producer system's resources.

FIG. 4 is a diagram of a consumer system's managed entities mapped to a producer system's resources. Consumer system 400 includes managed entities 402 through 420 that are hierarchically organized into four levels, which are levels 422 through 428. For example, managed entities 402 through 420 may be virtual private networks, servers, etcetera.

Producer system 430 includes resources 442 through 484, which are organized by resource class. FIG. 4 shows that producer system 430 includes three resource classes, which are a virtual routing and forwarding (vrf) resource class (resources 442-452), an interface resource class (resources 454-470), and a port resource class (resources 472-484). As one skilled in the art can appreciate, producer system 430 may have other resource classes that include servers, routers, databases, etcetera.

Figure 7:
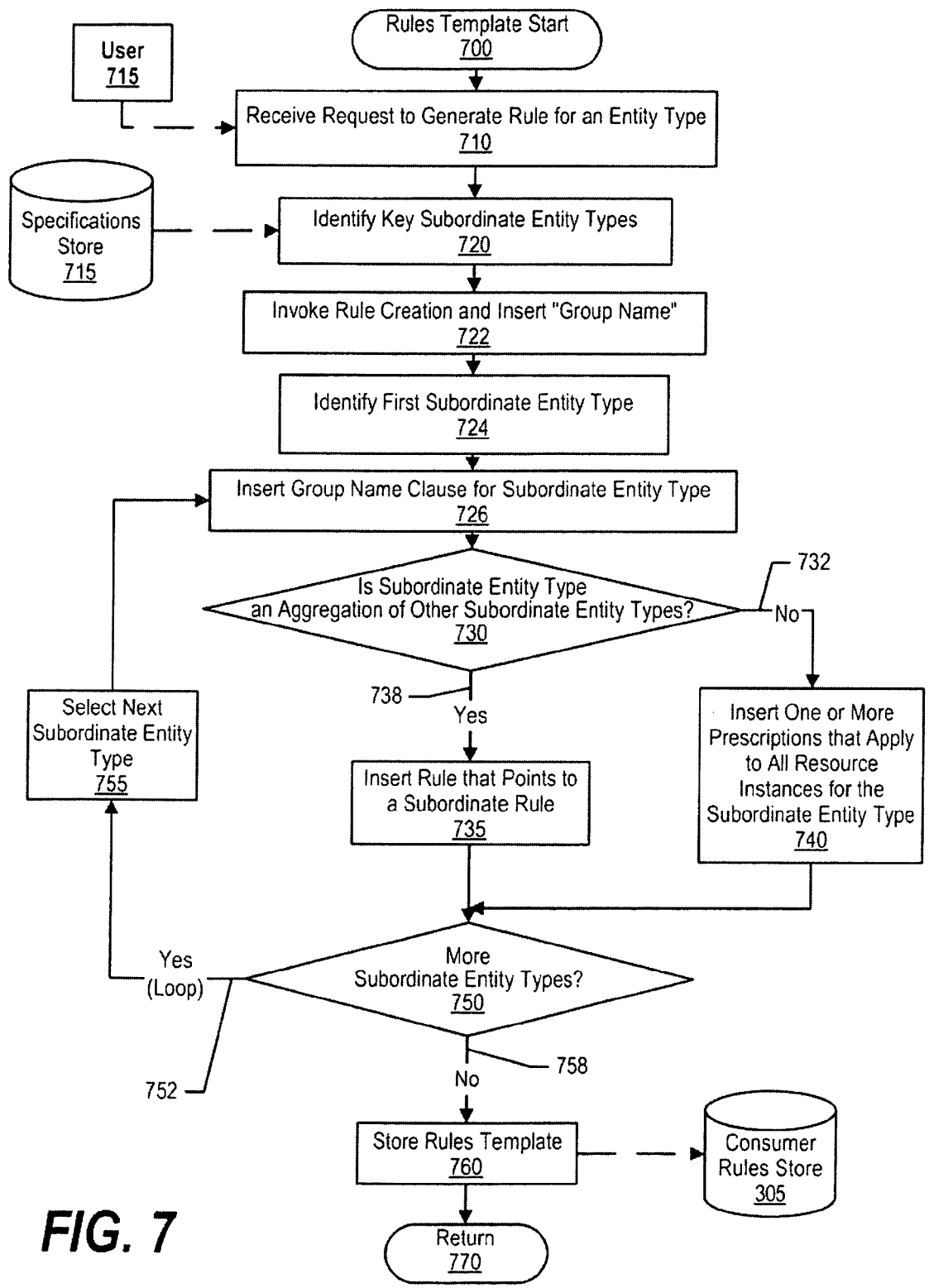
FIG. 7 is a flowchart showing steps taken in a consumer system generating rules based upon capabilities metadata received from a producer system.

Consumer system 400 generates rule "templates" at a "group" level, which are one or more managed entities that are the same entity type located at the same hierarchal level (see FIG. 7 and corresponding text for further details). Consumer system 400 then generates rule instances utilizing the rule templates for each of the individual managed entities (see FIG. 8 and corresponding text for further details). For example, HQ1 410 and Branch 1 412 may both be virtual private networks (same entity type) and are both located at the same hierarchal level (site level 426). In turn, consumer system 400 may generate a rule template that corresponds to both HQ1 410 and Branch 1 412, and then generate separate rule instances for HQ1 410 and Branch 1 412.

During rule template generation, consumer system 400 maps managed entities at the lowest hierarchical level (VPN level 428) to producer system 430 (maps 490-495) and associates managed entities at higher levels with a corresponding lower level, which is referred to herein as a subordinate level. As can be seen, managed entities included in VPN level 428 are subordinate to managed entities included in site level 426, which are subordinate to managed entities included in region level 424 that, in turn, are subordinate to managed entities included in customer level 422 As a result, each of the managed entities is directly or indirectly linked to producer system 430. This allows consumer system 400 to specify, to producer system 410, an organizational manner in which to provide prescription results (see FIG. 8 and corresponding text for further details). As one skilled in the art can appreciate, consumer system 400 may also include managed entities that are not hierarchically organized, but rather stand-alone entities, that are mapped to producer system 430.

Based upon a frame of reference, a level may be subordinate or superior to another level. For example, site level 426 is superior to VPN level 428, but is subordinate to region level 424. Consumer system 400 generates rules in a similar manner. Meaning, rules corresponding to site level 426 are superior to rules corresponding to VPN level 428, but are subordinate to rules corresponding to region level 424. A rule is referred to herein as a "subordinate rule" when the rule's corresponding hierarchical level is subordinate to another hierarchical level that has a corresponding rule, which is referred to herein as a superior rule.

Figure 5:
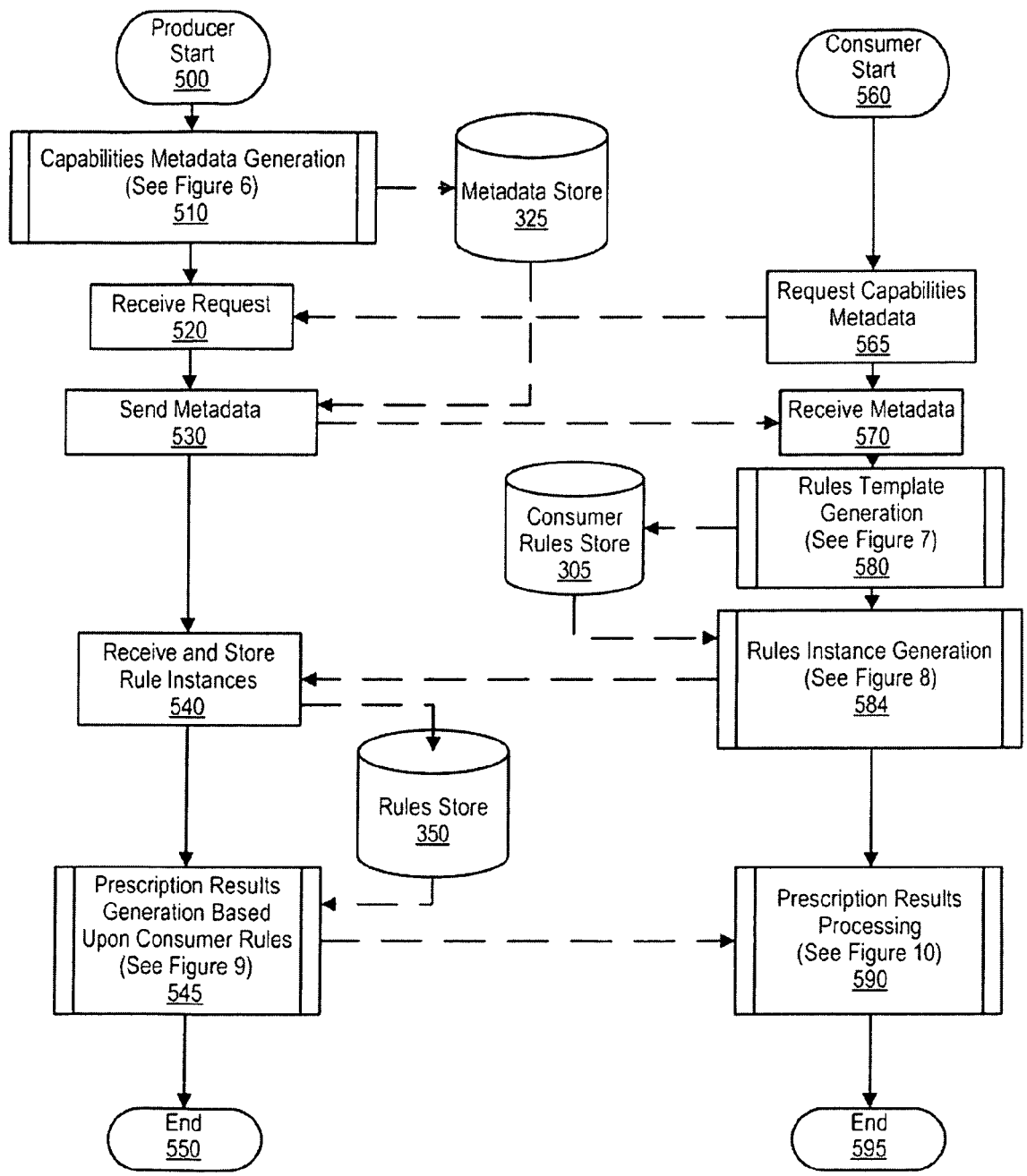
FIG. 5 is a high level flowchart showing steps taken in a consumer system generating rules based upon metadata provided by a producer system, and the producer system providing prescription results based upon the generated rules.

FIG. 5 is a high level flowchart showing steps taken in a consumer system generating rules based upon metadata provided by a producer system, and the producer system providing prescription results based upon the generated rules. Producer system processing commences at 500, whereupon the producer system generates capabilities metadata for each of its resource classes, which includes one or more metrics, and stores the capabilities metadata in metadata store 325 (pre-defined process block 510, see FIG. 6 and corresponding text for further details). Metadata store 325 is the same as that shown in FIG. 3.

Consumer system processing commences at 560, whereupon the consumer system requests the capabilities metadata from the producer system at step 565. The producer system receives the request at step 520, and provides the metadata to the consumer system at step 530. In one embodiment, the producer system may generate the capabilities metadata when the producer system receives the request from the consumer system.

At step 570, the consumer system receives the capabilities metadata and generates rule templates for the consumer system's entity types based upon the capabilities metadata (pre-defined process block 580, see FIG. 7 and corresponding text for further details). An entity type is a type of device included in the consumer system, such as virtual private network, a server, etcetera. The consumer system stores the rule templates in consumer rules store 305, which is the same as that shown in FIG. 3.

Figure 8:
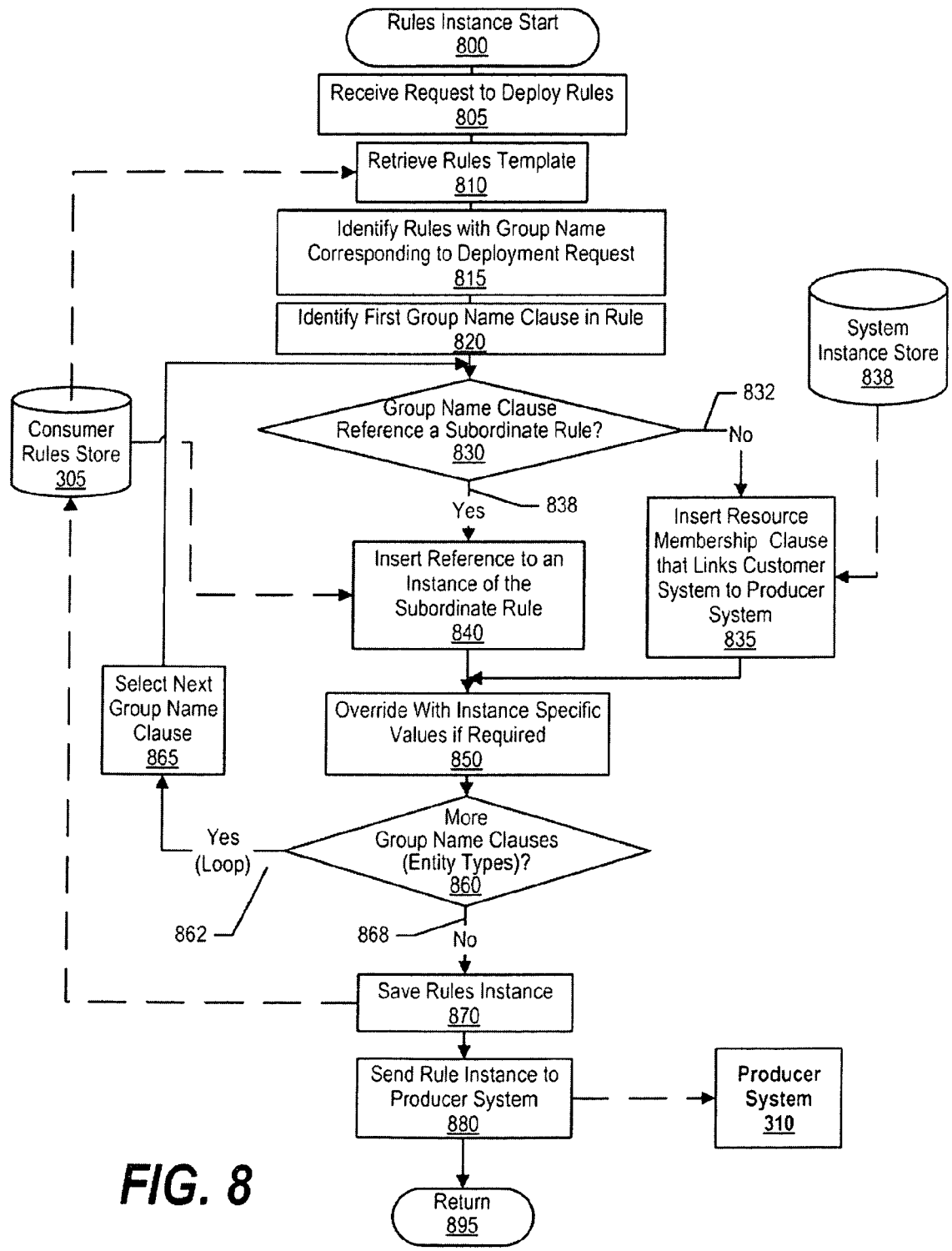
FIG. 8 is a flowchart showing steps taken in a consumer system deploying rules for one of a consumer system's managed entities.

When the consumer system deploys an entity, the consumer system generates instances of one of the rule templates stored in consumer rules store 305 based upon the entity's group (pre-defined process block 584, see FIG. 8 and corresponding text for further details). A group includes is one or more managed entities, which are the same entity type, that are located at the same hierarchical level within the consumer system. Referring to FIG. 4, HQ1 410 and Branch 1 412 are a group because they are the same entity types (VPN's) and are at the same hierarchal level (site level 426). As shown in FIG. 11B and discussed in more detail below, a rule includes a group name clause, one or more prescriptions, and may include a membership name clause. A rule's group name clause is often an attribute that may be concatenated with other resource attributes or static text. Each of the rule's prescriptions correspond to a particular metric included in the received capabilities metadata and may include a periodicity, a threshold crossing event, and/or summarizations or aggregations of other metrics.

At step 540, the producer system receives the rule instances and stores the rule instances in rules store 350. In one embodiment, at times or events specified by the generated rule instances, the producer system generates prescription results and sends the prescription results to the consumer system (pre-defined process block 545, see FIG. 9 and corresponding text for further details). Producer system processing ends at 550.

The consumer system receives the prescription results and processes the prescription results accordingly, such as creating, modifying, and/or deleting component nodes (pre-defined process block 590, see FIG. 10 and corresponding text for further details). Consumer system processing ends at 595.

Figure 6:
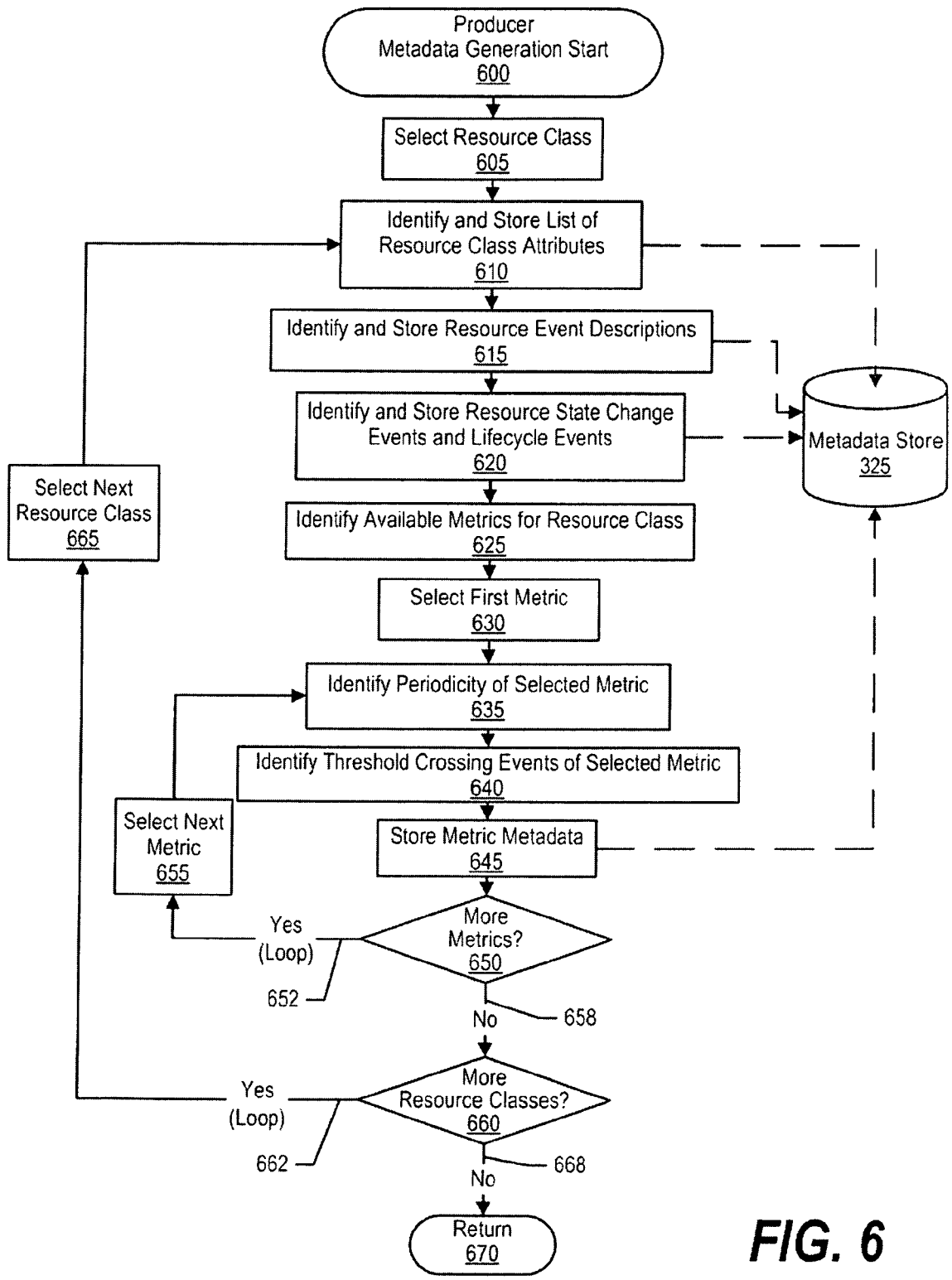
FIG. 6 is a flowchart showing steps taken in a producer system generating capabilities metadata for each resource class included in the producer system.

FIG. 6 is a flowchart showing steps taken in a producer system generating metadata for each resource class included in the producer system. Producer system metadata generation processing commences at 600, whereupon the producer system selects a first resource class, such as a virtual routing and forwarding (VRF) resource (step 605). At step 610, processing identifies and stores a list of resource class attributes in metadata store 325, such as instance identities and configurations. For example, FIG. 4 shows six instances of a VRF resource class, which are vrfA 442-vrfZ 452. Metadata store 325 is the same as that shown in FIG. 3.

At step 615, processing identifies and stores resource event descriptions for the selected resource class in metadata store 325, such as "interface utilization>75% over 5 minutes." Next, processing identifies and stores resource state change events and lifecycle events for the selected resource class, such as link up/down, resource created, and resource removed (step 620).

Processing proceeds to identify available metrics for the selected resource class at step 625, such as a range of time intervals that a metric is available (e.g., every minute up to every hour), and selects the first metric at step 630. Next, processing identifies a periodicity (time interval) of the selected metric at step 635. For example, metric X may be available once an hour. Processing then identifies threshold crossing events of the selected metric at step 640, such as over a threshold, under a threshold, or a baseline threshold. Processing stores the metric metadata with the resource class at step 645.

A determination is made as to whether there are more identified metrics for the resource class (decision 650). If there are more metrics, decision 650 branches to "Yes" branch 652, which loops back to select (step 655) and process the next metric. This looping continues until there are no more metrics in which to process, at which point decision 650 branches to "No" branch 658.

A determination is made as to whether there are more resource classes in which to generate metadata (decision 660). If there are more resource classes in which to generate metadata, decision 660 branches to "Yes" branch 662, which loops back to select (step 665) and process the next resource class. This looping continues until there are no more resource classes in which to process, at which point decision 660 branches to "No" branch 668, whereupon processing returns at 670.

FIG. 7 is a flowchart showing steps taken in a consumer system generating rule templates based upon capabilities metadata received from a producer system. Rules template generation processing commences at 700, whereupon the consumer system receives a request to generate a rule for an entity type from user 715 at step 710. At step 720, processing identifies key subordinate entity types using defined entity type relationships stored in specifications store 715. For example, regarding "key" subordinate entity types, a consumer system may include hot spares (multiple servers as backups) and, in this example, processing identifies entities that are active as opposed to spares. Next, processing invokes a rule creation (step 722) and inserts a group name to a rule, such as "Rule X."

Processing identifies a first subordinate entity type at step 724, and inserts a group name clause for the subordinate entity type at step 726. As discussed in detail in FIG. 4, subordinate entities are entities that are linked to a higher level entity from a hierarchical standpoint. A rule's group name clause may be concatenated with other resource attributes or static text, such as "VPN_sitename, where the static text "VPN_" is concatenated with the name of a site (see FIG. 11B and corresponding text for further details).

A determination is made as to whether the identified subordinate entity type is an aggregation of other subordinate entity types (decision 730). If the identified subordinate entity is not an aggregation of other subordinate entity types, decision 730 branches to "No" branch 732, whereupon processing inserts one or more prescriptions that apply to all resource instances at the producer system for the identified subordinate entity type (step 740). For example, prescriptions may be in the form of "resourceclass.metric@peridocity," "resourceclass.metric.thresholdcrossingevent," and/or "resourceclass.event."

On the other hand, if the subordinate entity type is an aggregation of other subordinate entity types, decision 730 branches to "Yes" branch 738, whereupon processing inserts a rule that points to a subordinate rule at step 735. For example, referring to FIG. 4, a rule for site level 426 would point to a rule for VPN level 428.

A determination is made as to whether there are more subordinate entity types (e.g., different entity types) (decision 750). If there are more subordinate entity types, decision 750 branches to "Yes" branch 752, which loops back to select (step 755) and process the next subordinate entity. This looping continues until there are no more subordinate entities in which to process, at which point decision 750 branches to "No" branch 758 whereupon processing stores the rule templates in consumer rules store 305 (step 760), which is the same as that shown in FIG. 3. Processing returns at 770.

FIG. 8 is a flowchart showing steps taken in a consumer system generating a rule instance for one of a consumer system's managed entities. Rules instance generation processing commences at 800, whereupon processing receives a request to deploy rules for a managed entity, such as integrating a new VPN into the consumer system. Processing retrieves rules from consumer rules store 305 (step 810), and identifies rules with a group name that corresponds to the deployment request, such as "VPN_HQ1" for the deployment of rules for collected aggregated metrics for HQ1 (step 815).

At step 820, processing identifies a first group name clause in the identified rule, and a decision is made as to whether the group name clause references a subordinate rule (decision 830) (see FIGS. 7, 11B, and corresponding text for further details). If the group name clause does not reference a subordinate rule, such as leaf nodes of a hierarchal tree, decision 830 branches to "No" branch 832, whereupon processing retrieves entity instance information from system instance store 838, and inserts a resource membership clause that links (maps) the customer entity to producer resources (step 835). For example, referring to FIG. 4, maps 490 and 491 link VPN1 414 to vrfA 442 and vrfB 444, respectively. System instance store 838 may be stored on a nonvolatile storage area, such as a computer hard drive.

On the other hand, if the group name clause references a subordinate rule, thus making it a superior rule (see FIG. 4 and corresponding text for further details), decision 830 branches to "Yes" branch 838, whereupon processing inserts a reference to an instance of the subordinate rule (stored in consumer rules store 305) at step 840. Consumer resource store 305 is the same as that shown in FIG. 3.

At step 850, processing overrides/includes instance specific values if required. For example, a subordinate rule may specify a periodicity of "every hour," and a user may wish to change the periodicity for a higher level managed entity to "every day." A determination is made as to whether there are more group name clauses in the rule (corresponding to different entity types) (decision 860). If there are more group name clauses in which to process, decision 860 branches to "Yes" branch 862, whereupon processing selects (step 865) and processes the next group name clause. This looping continues until there are no more group name clauses in which to process, at which point decision 860 branches to "No" branch 868, whereupon processing saves the rule instance in consumer rules store 305 (step 870). Processing sends the rule instance to producer system 310 at step 880, and returns at 895. Producer system 310 is the same as that shown in FIG. 3.

Figure 9:
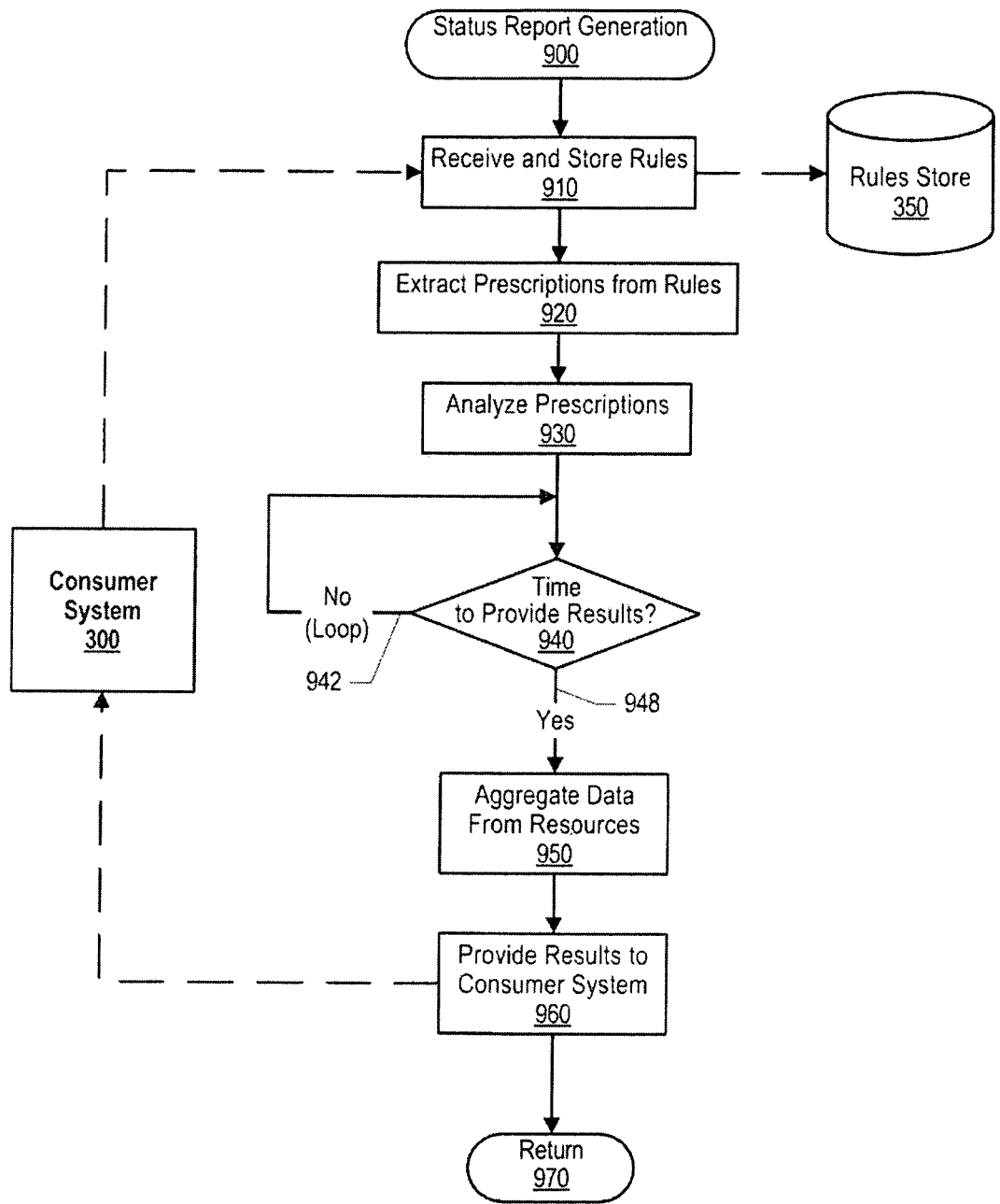
FIG. 9 is a flowchart showing steps taken in a producer system generating prescription results for a consumer system based upon rules generated by the consumer system.

FIG. 9 is a flowchart showing steps taken in a producer system generating prescription results for a consumer system based upon rules generated by the consumer system. Processing commences at 900, whereupon the producer system receives rules from consumer system 300 and stores the rules in rules store 350. Consumer system 300 and rules store 350 are the same as that shown in FIG. 3.

At step 920, processing extracts prescriptions from the rules and, at step 930, processing analyzes the prescriptions. During analysis, processing identifies periodicities, threshold crossing events, etcetera, that correspond to the producer systems' resource classes. A determination is made as to whether the producer system should provide results based upon the prescriptions (decision 940). For example, one of the prescriptions may specify a periodicity of every minute. If the producer should wait to provide results, decision 940 branches to "No" branch 942, which loops back to monitor when to send results to the consumer system. This looping continues until it is time to send results, at which point decision 940 branches to "Yes" branch 948.

At step 950, processing aggregates data from particular resource classes based upon the extracted prescriptions and, at step 960, processing provides the results to consumer system 300. As one skilled in the art can appreciate, a producer system may incorporate other mechanisms than what is shown in FIG. 9 for providing aggregated results to consumer system 300. Processing returns at 970, FIG. 10 is a flowchart showing steps taken in a consumer system processing prescription results generated by a producer system. In one embodiment, prescription results processing is dependent on the type of consumer system. For example, a consumer system may process prescription results in order to maintain a tree such as consumer system 400 shown in FIG. 4. In this embodiment, the prescription results may be written to a historical database for the consumer system to facilitate reporting, display information on a user interface, or subsequent analytics, which may be beyond the capabilities of a producer system or when a consumer system receives results from multiple producer systems that the consumer system wishes to correlate or combine.

Prescription results processing commences at 1000, whereupon the consumer system analyzes the prescription results received from the producer system (step 1010). A determination is made as to whether the consumer system should modify the rule tree based upon the analysis (decision 1020). For example, a rule's periodicity may be set to five minutes and the consumer system determines that values do not vary over short intervals. As result, to reduce the volume of data, the consumer system may change the periodicity to every hour. If the consumer system should modify the rule tree, decision 1020 branches to "Yes" branch 1022 whereupon processing creates, modifies and/or deletes rule nodes based upon prescription results context information (step 1030). On the other hand, if the consumer system should not modify the rule tree, decision 1020 branches to "No" branch 1028, bypassing step 1030.

At step 1040, processing selects the first node in the rule tree. Processing, at step 1050, adds a timestamp and prescription result attributes from the prescription results to the rule node that corresponds to a managed entity. For example, the consumer system may receive metrics in context from the producer, which the consumer system uses for a particular purpose (e.g., calculations). In this example, the consumer system creates a new "result" from these values and timestamps the result, such as a result produced from utilization, latency, and jitter metrics sent from the producer. In this example, the consumer uses the metrics to produce a quality metric for the service, which is subsequently time stamped.

At step 1055, processing compares the prescription results with performance level objectives of a managed entity corresponding to the selected node. For example, a regional site may monitor network traffic to ensure that the network traffic does not exceed a particular threshold. A determination is made as to whether a performance breach results in the comparison (decision 1060). Using the example discussed above, the prescription results may indicate that network traffic exceeds the regional threshold. If a performance breach occurred, decision 1060 branches to "Yes" branch 1062 whereupon processing resolves the performance breach at step 1065. For example, when a performance breach occurs from increased utilization, a producer system may require added capacity in order to support the increased utilization. In another example, when a performance breech occurs from an incorrectly tuned system, the producer system may require reconfiguration. In yet another example, when a performance breech occurs from a malfunctioning resource, the resource may require repair or replacement.

On the other hand, if no performance breach occurs, decision 1060 branches to "No" branch 1068. A determination is made as to whether there are more rule nodes included in the node tree in which to process (decision 1070). If there are more rule nodes to process, decision 1070 branches to "Yes" branch 1072, which loops back to select (step 1075) and process the next node. This looping continues until there are no more nodes in which to process, at which point decision 1070 branches to "No" branch 1078, whereupon processing ends at 1080.

FIG. 11A is a diagram showing an exemplary embodiment of capabilities metadata generated by a producer system. A producer system generates capabilities metadata 1100 for each resource class and provides it to a consumer system. Capabilities metadata 1100 includes resource attributes, resource event descriptions, resource state changes, resource lifecycle events, and one or more metrics.

The resource attributes identify attributes supported by a resource class (e.g., metrics, identity, configuration, etcetera). The resource event descriptions are threshold crossing event rules, such as the utilization>75% for more than 5 mins. The resource state change events are events supported by the resource class such as link up, or link down. The resource lifecycle events are resource created or resource removed. Each metric includes a metric name and may include a periodicity and a threshold crossing. The metric periodicity is a periodicity for the metric that is supported by the resource class (e.g., 1 second to 1 hour intervals, or asynchronous events). The metric threshold crossing evens are events supported by the resource class for the particular metric (e.g., over a threshold, under a threshold, baseline value, etcetera).

FIG. 11B is a diagram showing an exemplary embodiment of rules generated by a consumer system. A consumer system generates rules 1140 based upon capabilities metadata received from a producer system, such as capabilities metadata 1100 shown in FIG. 11A. Rules 1140 includes rules for each group level included in the consumer system (Rule D, Rule E, etcetera). Rules 1140 shows that Rule E is subordinate to Rule D, this indicating that the group level corresponding to rule E is subordinate to the group level corresponding to rule D.

Each rule includes a group name clause, one or more prescriptions, and may include a membership name clause. A rule's group name clause is often an attribute from member services and may be concatenated with other resource attributes or static text. Status prescriptions correspond to a particular metric included in the received capabilities metadata and may include a periodicity, a threshold crossing event, an event, and/or summarizations/aggregations of other metrics (e.g., average ResourceClass.metric every five minutes). The example shown in FIG. 11B includes a status prescription under "Rule D" of "ResourceClassA.MetricX@periodicity," which instructs a producer system to provide metric X (shown in capabilities metadata 1100) at intervals specified by "periodicity."

FIG. 11C is a diagram showing an exemplary embodiment of prescription results generated by a producer system based upon rules received from a consumer system. Prescription results 1160 are results based upon rules 1140 shown in FIG. 11B. Each result included in prescription results 1160 includes a group name, a rule identifier, a timestamp, and results for each prescription specified in rules 1140. The example shown in FIG. 11C shows that rule D results include "ResourceClassA.MetricX@periodicity Result," which is generated by the producer system based upon the prescription "ResourceClassA.MetricX@periodicity" included in rules 1140's Rule D status prescriptions.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    selecting a managed entity from a plurality of managed entities included in a consumer system, wherein the selected managed entity corresponds to a first hierarchical level included in the computer system;
    selecting a rule template corresponding to a subset of the plurality of managed entities included in the first hierarchical level, wherein the selected managed entity is included in the plurality of managed entities;
    receiving, at the consumer system, capabilities metadata from a producer system, wherein the capabilities metadata includes resource class metrics for a resource class included in the producer system;
    in response to receiving the capabilities metadata, creating, at the consumer system, a rule from the rule template that corresponds to the selected managed entity included in the consumer system, wherein the rule is subordinate to a superior rule corresponding to a second hierarchal level included in the consumer system and includes one or more prescriptions that reference the resource class metrics and specify a periodicity, the periodicity informing the producer system as to a time interval for which to send prescription results to the consumer system that includes metric information pertaining to the resource class metrics;
    sending the rule from the consumer system to the producer system;
    receiving, at the specified periodicity included in the rule, the prescription results from the producer system at the consumer system;
    comparing the prescription results to one or more objectives;
    detecting a breach in response to the comparison; and
    resolving the breach in response to the detection.

2. The method of claim 1 wherein the resource class metrics include a first resource class metric and a second resource class metric, the method further comprising:
    including a first prescription in the rule that corresponds to the first resource class metric;
    including a second prescription in the rule that corresponds to the second resource class metric; and
    including a third prescription in the rule that aggregates the first resource class metric and the second resource class metric.

3. The method of claim 2 wherein the first resource class metric corresponds to a first resource class included in the producer system and the second resource class metric corresponds to a second resource class included in the producer system, wherein the first resource class is different than the second resource class.

4. The method of claim 1 wherein one of the prescriptions specifies a threshold crossing event for one of the resource class metrics, the threshold crossing event selected from the group consisting of a minimum value, a maximum value, and a summation value.

5. The method of claim 1 wherein the objective is a performance level objective and wherein the breach is a performance breach.

6. The method of claim 1 wherein:
    each of the subset of the plurality of managed entities correspond to a same entity type; and
    the superior rule includes a pointer to the subordinate rule that incorporates the prescriptions of the subordinate rule.

7. The method of claim 1 wherein the applying further comprises adding a timestamp and the prescription results to a rule node within a rule tree that corresponds to the rule.

8. The method of claim 7 further comprising creating a different rule node within the rule tree based upon the prescription results.

9. The method of claim 1 wherein, at the producer system, generation of the capabilities metadata further comprises:
    selecting the resource class;
    identifying a resource class attribute corresponding to the resource class;
    identifying a resource event description corresponding to the resource class;
    identifying a resource state change event corresponding to the resource class; and
    including the resource class attribute, the resource event description, and the resource state change event in the capabilities metadata.

10. The method of claim 1 wherein, at the producer system, generation of the prescription results further comprises:
    identifying a rule node that corresponds to the rule;
    constructing a predicate from a resource membership clause corresponding to the rule node;
    selecting a list of resource instances based upon the predicate; and
    executing a group name clause algorithm and inserting one or more resource instances into a group corresponding to the rule node.

11. A computer program product stored in a computer readable storage device, comprising functional descriptive material that, when executed by an information handling system, causes the information handling system to perform actions that include:
    selecting a managed entity from a plurality of managed entities included in a consumer system, wherein the selected managed entity corresponds to a first hierarchical level included in the computer system;
    selecting a rule template corresponding to a subset of the plurality of managed entities included in the first hierarchical level, wherein the selected managed entity is included in the plurality of managed entities;
    receiving, at the consumer system, capabilities metadata from a producer system, wherein the capabilities metadata includes resource class metrics for a resource class included in the producer system;
    in response to receiving the capabilities metadata, creating, at the consumer system, a rule from the rule template that corresponds to the selected managed entity included in the consumer system, wherein the rule is subordinate to a superior rule corresponding to a second hierarchal level included in the consumer system and includes one or more prescriptions that reference the resource class metrics and specify a periodicity, the periodicity informing the producer system as to a time interval for which to send prescription results to the consumer system that includes metric information pertaining to the resource class metrics;

sending the rule from the consumer system to the producer system;

receiving, at the specified periodicity included in the rule, the prescription results from the producer system at the consumer system;

comparing the prescription results to one or more objectives; detecting a breach in response to the comparison; and resolving the breach in response to the detection.

12. The computer program product of claim 11 wherein the resource class metrics include a first resource class metric and a second resource class metric, the information handling system further performing actions that include:

including a first prescription in the rule that corresponds to the first resource class metric;

including a second prescription in the rule that corresponds to the second resource class metric; and including a third prescription in the rule that aggregates the first resource class metric and the second resource class metric.

13. The computer program product of claim 12 wherein the first resource class metric corresponds to a first resource class included in the producer system and the second resource class metric corresponds to a second resource class included in the producer system, wherein the first resource class is different than the second resource class.

14. The computer program product of claim 11 wherein one of the prescriptions specifies a threshold crossing event for one of the resource class metrics, the threshold crossing event selected from the group consisting of a minimum value, a maximum value, and a summation value.

15. The computer program product of claim 11 wherein the objective is a performance level objective and wherein the breach is a performance breach.

16. The computer program product of claim 11 wherein
each of the subset of the plurality of managed entities correspond to a same entity type; and
the superior rule includes a pointer to the subordinate rule that incorporates the prescriptions of the subordinate rule.

17. The computer program product of claim 11 wherein the applying further comprises adding a timestamp and the prescription results to a rule node within a rule tree that corresponds to the rule.

18. The computer program product of claim 17 further comprising creating a different rule node within the rule tree based upon the prescription results.

19. An information handling system comprising:
one or more processors;
a memory accessible by at least one of the processors;
a nonvolatile storage area accessible by at least one of the processors;
a set of instructions stored in the memory and executed by at least one of the processors in order to perform actions of:
selecting a managed entity from a plurality of managed entities included in the information handling system, wherein the selected managed entity corresponds to a first hierarchical level included in the information handling system;
selecting a rule template corresponding to a subset of the plurality of managed entities included in the first hierarchical level, wherein the selected managed entity is included in the plurality of managed entities;

receiving, at the information handling system, capabilities metadata from a producer system, wherein the capabilities metadata includes resource class metrics for a resource class included in the producer system;

in response to receiving the capabilities metadata, creating, at the information handling system, a rule from the rule template that corresponds to the selected managed entity included in the information handling system, wherein the rule is subordinate to a superior rule corresponding to a second hierarchal level included in the consumer system and includes one or more prescriptions that reference the resource class metrics and specify a periodicity, the periodicity informing the producer system as to a time interval for which to send prescription results to the information handling system that includes metric information pertaining to the resource class metrics;

sending the rule from the information handling system to the producer system;

receiving, at the specified periodicity included in the rule, the prescription results from the producer system at the information handling system;

comparing the prescription results to one or more objectives;

detecting a breach in response to the comparison; and resolving the breach in response to the detection.

20. The information handling system of claim 19 wherein the resource class metrics include a first resource class metric and a second resource class metric, the information handling system further performing actions that include:

including a first prescription in the rule that corresponds to the first resource class metric;

including a second prescription in the rule that corresponds to the second resource class metric; and including a third prescription in the rule that aggregates the first resource class metric and the second resource class metric.

21. The information handling system of claim 20 wherein the first resource class metric corresponds to a first resource class included in the producer system and the second resource class metric corresponds to a second resource class included in the producer system, wherein the first resource class is different than the second resource class.

22. The information handling system of claim 19 wherein one of the prescriptions specifies a threshold crossing event for one of the resource class metrics, the threshold crossing event selected from the group consisting of a minimum value, a maximum value, and a summation value.

23. The information handling system of claim 19 wherein the objective is a performance level objective and wherein the breach is a performance breach.

24. The information handling system of claim 19 wherein:
each of the subset of the plurality of managed entities correspond to a same entity type; and
the superior rule includes a pointer to the subordinate rule that incorporates the prescriptions of the subordinate rule.

25. The information handling system of claim 19 wherein the applying further comprises adding a timestamp and the prescription results to a rule node within a rule tree that corresponds to the rule.

26. The information handling system of claim 25 further comprising creating a different rule node within the rule tree based upon the prescription results.

* * * * *